(12) United States Patent
Kramer et al.

(10) Patent No.: US 6,444,260 B2
(45) Date of Patent: Sep. 3, 2002

(54) COMPOSITIONS CONTAINING SOLIDS

(76) Inventors: Kane N. Kramer, They Courtyard, Poynders End, Preston, Hitchin Herts, SG4 7RX (GB); Christopher Thomas, 20 Florence Street, Hitchin Herts, SG5 1QZ (GB)

( * ) Notice: Subject to any disclaimer, the term of this patent is extended or adjusted under 35 U.S.C. 154(b) by 0 days.

(21) Appl. No.: 09/726,886

(22) Filed: Nov. 30, 2000

Related U.S. Application Data

(63) Continuation of application No. 09/077,407, filed as application No. PCT/GB96/02950 on Nov. 29, 1996, now abandoned.

(30) Foreign Application Priority Data

Nov. 29, 1995 (GB) ............................................. 9524391

(51) Int. Cl.$^7$ ................................................. B05D 1/00
(52) U.S. Cl. ........................ 427/201; 427/355; 524/13
(58) Field of Search ................................ 427/180, 201, 427/355; 524/3

(56) References Cited

U.S. PATENT DOCUMENTS 4,614,755 A    9/1986   Rodgers
4,948,443 A    8/1990   Speer

FOREIGN PATENT DOCUMENTS

| CS | 227522   |   | 9/1985  |
|----|----------|---|---------|
| CS | 2 38 159 | * | 11/1985 |
| CS | 276 053  | * | 3/1992  |
| DE | 27 05 683 |  | 3/1978  |
| DE | 300 980  | * | 9/1992  |
| FR | 2 491 784 |  | 4/1982  |
| GB | 853759   |   | 11/1960 |

* cited by examiner

*Primary Examiner*—Erma Cameron
(74) *Attorney, Agent, or Firm*—Stetina Brunda Garred & Brucker

(57) ABSTRACT

A solid-particulates-containing composition that can be available ready-made but with a substantial shelf life; in one form it can truly be applied like a conventional paint, and in another form in workable in the manner of a putty. With only a light polishing or burnishing it gives an excellent finish. More specifically, the solid-particulates-containing composition comprises 5–80% by volume of the chosen particulate solid dispersed within either a vinyl acetate polymer product or an acrylic polymer product (or one which is a mixture of the two, with, per 100 volume parts of vinyl acetate polymer product, 5–80 parts of acrylic polymer product), there being, per 100 volume parts of the chosen polymer, from 25 to 80 parts of water.

18 Claims, No Drawings

COMPOSITIONS CONTAINING SOLIDS

This application is a continuation of application Ser. No. 09/077,407, filed Dec. 29, 1998 and now abandoned which is a 371 of PCT/GB96/02950 filed Nov. 29, 1996.

This invention relates to solids-emulating compositions, and concerns in particular solid-particulates-containing paintable or mouldable materials for functional and/or decorative purposes.

There are many occasions when it is desirable, for either functional or purely aesthetic reasons, to give some article or one solid material a coating or appearance of another solid material. For aesthetic purposes, for instance, it might be thought attractive to provide a non-metal object—a wooden carving or a plaster moulding—with the visual appearance of real metal, such as copper, iron, brass or bronze. Similarly, it might be desirable to provide a non-mineral object with the appearance of rock or stone. For functional purposes, for example, it might be desirable to form on a substrate a layer with a high electrical impedance and with the appearance of metal. And from a practical point of view it is clearly desirable that such coatings be applicable in as easy a manner as possible—by being painted on with a brush, say—and that after application the finished surface lend itself to the kind of physical or chemical treatment that a real metal or mineral surface would allow, such as burnishing or polishing, or some sort of chemical alteration. The invention proposes one way of achieving this capability, by using a curable resin-based composition carrying dispersed therein some suitable particulate solid.

It is already known to provide settable curable resin-based metal compositions, primarily for decorative purposes such as making solid objects like busts using a mould, but those presently available tend to be rather inflexible in their mode of use (with a fairly limited number of applications), as well as being quite difficult to employ (the chemicals involved are inclined to be hazardous to health). One such composition, generally intended for making solid objects such as figurines, busts and the like, is provided in three constituent parts—the resin, the metal, and a catalyst—which the User must mix together immediately prior to use (and there is then only a limited amount of time to employ the resin before it sets). Moreover, not only is this type of resin-based substance difficult and unpleasant to use, but in general it cannot easily be applied to a surface with a brush, nor does the finished surface readily lend itself to subsequent physical or chemical treatment.

Another such composition, or group of compositions, is described in the 1978 Specification of published French Patent Application No: 2,364,256 (the corresponding German Offenlegungsschrift is No: 27 05 683). These compositions, like some of those of the present invention, are intended to be employed to provide metal (or metal-like) coatings of one sort of material on substrates of another, to give the substrate a different appearance or properties, but they, too, are provided in separate constituent parts which are mixed just before use. The compositions, too, are in reality difficult and unpleasant to use, and though they can be applied to a surface with a brush or like implement it is not easy to achieve a good finish this way (and nor do the coatings adhere well to the underlying material surface). Moreover, the formed coatings have right from the start a surface "skin" or "film" of opaque resinous material that effectively totally obscures the included metal, and this skin has to be removed after the resin has set—a process which, according to the Specification, requires considerable amounts of abrasion (using coarse abrasives, such as steel wool, abrasive brushes and abrasive powder) to remove the film-forming resin, followed by several more separate "polishing" stages (using finer abrasives or polishing disks or fabrics). This produces residual dust, which is unhealthy and environmentally unfriendly. And if the substrate surface is rough, or even merely dimpled, it is difficult, if not impossible, to remove from the surface sufficient of the skin to reveal the included metal in the depressed areas without actually taking almost all of the layer off the protruding areas.

The invention in one form suggests a novel solid-particulates-containing composition that deals with these problems—a composition that can be available ready made (rather than having to be made up immediately prior to use) but with a substantial shelf life; that can truly be applied like a conventional paint, using a simple paint brush or roller; and that gives with almost no further treatment other than a dust-free light polishing or burnishing an excellent finish which lends itself to a variety of uses and treatments as if it were the surface of an ordinary object of that solid. More specifically, the invention proposes a solid-particulates-containing composition comprising from 5% to 80% by volume of the chosen particulate solid dispersed within either a vinyl acetate polymer composition or an acrylic polymer composition—especially such a composition which contains, per 100 volume parts of the chosen polymer, some water, and particularly from 25 to 80 parts of water. To date, the best compositions seem to be those aqueous compositions that contain both vinyl acetate polymer and acrylic polymer, the amounts being such that, per 100 volume parts of vinyl acetate polymer, there are from 5 to 80 parts of acrylic polymer and from 30 to 80 parts of water. The great advantages of such a composition over those of the Art stem mainly from its aqueous nature—not only does this mean that the compositions, curing (as they do) by loss of water following application, remain usable in the pot for weeks, if not months, after being opened, but it also means that the compositions can be thinned (within limits) to adjust their consistency, applicability and spreading power simply by adding (tap) water, and that they are essentially non-toxic (the normal water-dispersible vinyl acetate polymer and acrylic resins are effectively harmless, and there are no unpleasant organic solvents/diluents or catalysts/hardeners). In addition, by selecting these particular resinous materials—a water-dispersible vinyl acetate polymer and a water-dispersible acrylic resin—there is provided a coating which, on drying, appears to have no, or substantially no, resin material in the form of a skin on top of, and obscuring, the particulate solid, so that with even the most minimal polishing or burnishing (and without the use of any real abrasives) the coating takes on the appearance, and even some of the properties, of the particulate solid.

In one aspect, therefore, the invention provides a composition usable for application as a coating to a surface, the composition being an aqueous dispersion of solid particles within a resinous carrier and comprising:

from 5% to 80% by volume of particulate solid dispersed within either a vinyl acetate polymer composition or an acrylic polymer composition.

There are preferably from 25 to 80 volume parts of water per 100 volume parts polymer.

Though the composition of the invention is one which contains either vinyl acetate polymer or acrylic polymer, these are not exclusive, and indeed the most preferred compositions of the invention contain both (as noted above). Very preferably, therefore, the invention provides a composition for applying as a coating to a surface, the composition being an aqueous dispersion of solid particles within a resinous carrier and comprising:

from 5% to 80% by volume of particulate solid dispersed within a vinyl acetate polymer composition containing, per 100 volume parts of vinyl acetate polymer, from 5 to 80 parts of acrylic polymer, and from 30 to 80 parts of water.

The invention in one form provides a composition for applying a coating to a surface. The coating is a coating of real solid—whichever solid, or combination of solids, has been employed as the particulate solids—and, depending on the physical form of the particles, and the amount thereof, may actually form an effectively continuous solid layer extending over the surface carrying the coating. Depending on the nature of the solid—if it were copper, nickel, silver or gold, for example—such a layer could be electrically conductive, and so might be of value in the formation of articles such as printed circuit boards, and heating elements, or as a base for a subsequent electroplating operation.

The composition of the invention in one form is for applying a coating to a surface (although it may doubtless be utilised for other purposes, such as, for example, being "set" in a mould or shaped by hand to form a solid article; this is discussed further hereinafter). This surface can take almost any physical form, and can be of a wide variety of substrates, including metal, wood, polystyrene (and other plastics of many sorts), plaster, glass, paper, acetate, cardboard, hardboard, concrete, brick, and ceramics. Any substrate that does not give a good tooth to the composition can first be coated with a primer. Polystyrene, which is normally difficult to adhere to without softening of the polystyrene, can readily be adhered to by compositions of the invention.

The preferred compositions of the invention comprise a dispersion of solid particles in an aqueous resinous carrier dispersion. The solid can be any of a vast range, including: metals, such as copper, brass, nickel brass, bronze, silver, aluminium and gold, and even relatively hard metals like iron, steel, nickel and titanium; minerals, such as granite, marble, mica, sandstone, slate, and fired or unfired clay (such as terracotta); other solids, such as carbon and glass; and mixtures of two or more of these. The particles can be of any suitable size small enough to stay dispersed without the need for frequent or too-violent agitation (although on the shelf compositions of the invention may in time show signs of some settling-out, they can be re-dispersed by simple stirring and/or shaking), and the commercially-available powdered solids seem quite satisfactory.

The amount of solid employed in the compositions of the invention can vary over a wide range, though obviously very small amounts—less than 15%, say—may require a number of coats to be applied to the desired surface to achieve a satisfactory result, while very large quantities—50% or more, say—may result in a final composition that is too heavy in solid to be readily workable as a paint. For a paintable composition the range should be up to 50% by volume of particulate solid, preferably 5% to 45%, with an especially preferred range being from 35% to 45%. The most convenient compositions are those that include amounts at the upper end of this range. However, for a solid-object-forming composition, to be described hereinafter, the corresponding figures are somewhat higher, typically 70% and from 50% to 65%.

The compositions of the invention comprise solid particles within either or both (a mixture) of an acrylic polymer and a vinyl acetate polymer. This latter polymer may be a plain homopolymer—a polyvinyl acetate—or a heteropolymer—an ethylene vinyl acetate, for instance. In the preferred compositions the purpose of the vinyl acetate polymer is to act as the main carrier for the solid particles, and to provide a firm but flexible layer that adheres well to the surface of the underlying substrate. So far as can be determined the vinyl acetate can be any one or more of the varieties of vinyl-acetate-containing products used or suggested for use as a sealant, binder or adhesive, and many such products are commercially available. A typical plasticised vinyl acetate homopolymer has a glass transition temperature ($T_g$) of around 10° C. (the majority of vinyl acetate polymers have $T_g$s of from 5° C. to 30° C.).

The compositions of the invention utilise one or both (a mixture) of vinyl acetate polymer and acrylic polymer. In the mixture the primary purpose of the acrylic polymer is to soften the vinyl acetate polymer, and leave it workable for sufficient time to allow the coating to be formed and spread out by brushing. The amount of acrylic should thus be sufficient for this purpose—per 100 volume parts of vinyl acetate polymer, 5 parts of acrylic polymer are usually just enough to get the vinyl acetate polymer into a workable form, while with more than 100 volume parts the composition will generally be too soft and runny to be very useful. A more convenient upper limit is 80 volume parts, while the more preferred compositions contain amounts at the lower end of the range—thus, from 15 to 35 volume parts, and especially 25 volume parts.

The acrylic polymer can be any one or more of the many known polymers of this sort—usually available as aqueous emulsions of the polymer per se—and typical such products are based on acrylic or methacrylic acid derivatives and have $T_g$ values of around 35° C. (the majority of water-dispersible acrylic resins have $T_g$s of 35° C. to 70° C.).

The preferred compositions of the invention comprise particulate solid(s) dispersed within an aqueous polymer composition—that is, a composition of the polymer materials themselves dispersed in water. The water is primarily merely a thinner and extender, mainly to dilute the polymer—the vinyl acetate polymer, say—and so render it more workable, and should be used in an amount sufficient for this and to result in a pasty, brushable composition with a reasonable shelf life. Small amounts of water—less than 30 parts, say—cause the composition to set too quickly, and to build up on the brush, so being difficult to apply, while large amounts—more than 80 parts, perhaps—make the composition too runny, and cause it to take too long to set (and to need too many coats to build up a layer of the required thickness), 40–70 parts seems a reasonable quantity. Incidentally, it is possible to "thin" the compositions of the invention not just with water but also with one of the proprietary acrylic thinners, such as Airbrush Medium.

A particularly-preferred polymer mixture composition of the invention is one that contains, per 100 parts of vinyl acetate polymer, 25 parts of acrylic polymer and 50–70 parts of water, and, for each 30 parts of this preliminary composition, 20 parts of solid powder.

The compositions of the invention may settle out, and therefore it may be beneficial to include one or more of a particle-suspending surface active agent and a thickening agent. Perhaps surprisingly, many common surfactants will suffice, even conventional washing-up liquid, while a useful thickening agent is AQUA PASTO (an acrylic thickener available from Windsor & Newton). A particularly-preferred detergent-incorporating polymer mixture composition of the invention is one that contains, per 100 parts of vinyl acetate polymer, 25 parts of acrylic polymer, 50 parts of water, 1.5 parts of unscented, colourless liquid detergent, and, for each 30 parts of this preliminary composition, 20 parts of solid powder. And an especially preferred variant of this latter composition is one that additionally contains, per 100 parts of vinyl acetate polymer, 1 part of a thickener such as AQUA PASTO.

The compositions of the invention are primarily for applying a coating to a surface. However, they—or modified versions of them—may be utilised for other purposes, such as, for example, forming very thick layers or coatings on a substrate, or even being "set" in a mould to form a solid article. More particularly, it has been found that the compositions can be "bulked out", using a fibrous material such as cellulose (paper) conveniently added as an aqueous pulp (and so providing some or all of the water required in the composition). In this way the compositions become putty-like, and can be handled and moulded into three-dimensional shapes that in time set to become stable solids. Such solids can be cut or carved into other shapes, and when given an appropriate "finishing"—such as by brushing, polishing or burnishing—are indistinguishable from the "real" thing (that is, an object made of metal, stone, or whatever the particulate solid was).

The compositions of the invention can be made by simple admixture of the ingredients, though it is convenient first to make a preliminary composition by mixing the water and polymers, and then to add to this the solid particles and any other components. Proper mixing (and subsequent film-formation) of the non-solids parts of the compositions may be improved by the addition of small amounts of co-solvents (typically water-miscible glycols), while thorough dispersion (and subsequent re-dispersion) of the solids can be aided by including small amounts of a detergent, a flow-control agent such as molybdenum or graphite, or a suitable thixotropic material. Re-dispersion by shaking can also be assisted by including a small mixer—a ball bearing or two—in the container. Excessive foaming can be dealt with by incorporating a suitable anti-foaming agent. Film-formation subsequent to application may be improved by incorporating a suitable coalescing solvent.

Naturally, the invention's compositions can contain such bioactive materials as fungicides, bactericides and bacteriostats.

In the main, the invention's compositions can be—and are primarily intended to be—applied with a brush or roller, as if they were paint (though they can be sprayed with the appropriate equipment). It is therefore especially simple to use two different metal or other solid compositions in conjunction to create effects as required—for instance, picking out certain objects on, or parts of, a surface with one metal, and so having one appearance, while the rest—the background, perhaps—is of a different metal. Thus, a sculptured or moulded surface with the appearance of a bas-relief might have the raised parts in copper and the recessed parts in iron.

One of the advantages of the invention's compositions is that the surface resulting from use of such a composition can thereafter be modified almost as if it were a real solid object. While the coating is still relatively fluid (and has not set completely) it can be given a stippled surface by dabbing it with a sponge, whereas once it is dry it can be gently rubbed with, for example, a soft, fine suede brush (this tends to produce no "dust" residue) to brighten the finish (note that this rubbing "polishes" the surface rather than abrading it away). Furthermore, for metal, well-known metal cleaners (such as DURAGLIT or BRASSO) can maintain a previously-attained shine on the metal, or the metal can be treated with one or more of a number of known chemical substances that are used to produce specific effects on metals (for instance, COPRA can be used to verdigris a painted-on copper layer of the invention just as it can a real copper object). Moreover, the finished surface can be coated in a manner known per se to protect the surface against such things as tarnishing and corrosion.

Though the compositions of the invention may find their primary use being for aesthetic reasons, and so perhaps as a decorative paint, they also have a number of functional, possibly industrial, uses. With sufficient metal included the paint might conduct electricity, and might therefore be usable in semi-conductor and circuit technology. Other compositions might be employed to create coatings usable in interference shielding technology (for example, a carbon-containing composition could be usable to shield against radio-frequency signal interference, whilst a nickel-containing composition could be usable to shield such things as computers against static electricity), while an iron-containing composition has magnetic properties. The use of the composition as a preliminary layer in a plating process might also be feasible. With a titanium-containing composition, it is very easy to obtain a titanium finish on a surface, even though titanium itself is extremely difficult to work, and especially to weld and to deform.

Although the invention has its primary application in providing metallic coatings, it is also applicable to the provision of mineral-like and other coatings.

Moreover, the invention is applicable to providing mixed solids coatings; for example, a composition containing a mixture of sands and rustable metal powder can give a real sandstone effect after rusting of the metal powder.

The invention in its primary aspect is a composition that can be used to give to a substrate of one material the appearance of another material, and in another aspect the invention provides just that—a method for supplying the surface of a substrate of one material with the appearance of another material, in which method there is applied to the substrate surface a composition of the invention.

As explained hereinbefore, the formed surface coating may be acceptable and sufficient in itself; however, if required, or appropriate, the formed surface coating may thereafter be given a further treatment to modify or enhance it. For example, while still slightly "wet", it can be dabbed to give it a stippled finish, while when fully dry it can be polished, burnished, buffed and so on to give it a shine. One particular advantage of many of the metal coatings or solid objects formed by the compositions of the invention is that they are "mutually" burnishing—that is, one coated substrate or solid object can be rubbed against another, and both are burnished. For example, a solid object made from a composition of the invention can be used as a burnishing tool on a coated substrate.

The compositions of the invention—perhaps it should be said the preferred compositions of the invention—are each an aqueous dispersion of solid particles within a diluted mixture of a resinous carrier and comprising from 5% to 80% by volume of particulate solid dispersed within a vinyl acetate polymer composition containing, per 100 volume parts of vinyl acetate polymer, from 5 to 80 parts of acrylic polymer, and from 50 to 80 parts of water. As noted hereinbefore the preferred materials for use as the vinyl acetate polymer and the acrylic polymer have glass transition temperatures—$T_g$s—of up to 10° C. (perhaps up to 20° C.) and from 30° C. to 70° C. respectively. It now seems possible that this particular property—the $T_g$—of the polymer materials is important in explaining the desirable effects achieved with the compositions of the invention, and indeed that it is each material's $T_g$, rather than its chemical nature (polymeric vinyl acetate or acrylic) that determines whether the resulting composition is suitable for making layers/coatings of the sort here desired. Accordingly, in yet another aspect this invention provides a composition for applying as a coating to a surface, the composition comprising an aqueous dispersion of solid particles within a diluted mixture of a resinous carrier and comprising:

a particulate solid;

a particulate organic film-forming polymer (or copolymer) having a $T_g$ of below 10° C.; and a particulate organic film-forming polymer (or copolymer) having a $T_g$ of above 30° C.

Naturally, the invention also provides a method for supplying the surface of a substrate of one material with the appearance of another material, in which method there is applied to the substrate surface a composition as just defined—and thereafter performing any subsequent treatment stage, such as polishing or burnishing, as may be required.

According to a further aspect of the present invention there is provided a composition for working in the manner of a paint or putty, comprising an aqueous dispersion of solid particles within a mixture of a carrier substance and a carrier-softening substance, the carrier substance serving to provide a firm anchorage for the particles.

The following Examples (in which all parts are by volume) are now given, though by way of illustration only, to show details of particular embodiments of the invention.

EXAMPLE I

A Composition Usable to Provide an Iron-Like Finish

1. Making the composition

To produce a suitable composition with iron as the required metal finish, 25 parts acrylic polymer, 100 parts polyvinyl acetate, and 60 parts tap water were mixed and stirred for 2–3 minutes until there was formed a well-blended mixture. 60 parts of this preliminary composition were placed in a large plastics pot, and 40 parts of iron powder (dust-size particles; available from ALEC TIRANTI) were added. The whole was then agitated for a couple of minutes.

2. Applying the composition to wood

To apply a satisfactory coat of the formed composition to wood, an ordinary brush was used to form a layer on the wood liberally and quickly. The covering should ideally be thick and reasonably even.

A natural sponge was then dabbed onto the surface (before it had completely dried) to create a stipple finish on the coat.

After 20 minutes the first coat was dry, and after wetting it slightly with a damp sponge a second coat was applied in much the same manner as the first, and left (for another 20 minutes) to dry to a complete, even finish.

3. Subsequent treatment

The finish after these applications was a matt, charcoal grey colour, which in certain situations is a perfectly suitable decorative finish. However, a number of different finishes are easily obtainable. In one case, when the second coat was completely dry it was lightly brushed and cleaned with medium wire wool, followed by burnishing with a standard burnishing tool. This left a finish that was almost pure metal, and that could be cleaned, polished etc. just as metal.

In another case, the use, after burnishing, of TOR-MALENE (available from ALEC TIRANTI), a standard decorative procedure, produced a matt black finish. If the surface is in relief, then successive treatment with medium wire wool followed by fine wire wool produces a finish that accentuates the relief effect.

On another sample of the iron finish there was applied COPRA (available from ALEC TIRANTI: this is normally used on copper to verdigris the metal). On the iron it produced a rust finish when allowed to dry naturally or a green-blue finish if it was heat dried.

EXAMPLE II

A Composition Usable to Provide a Waterproof Iron-Like Finish

This Example was exactly in accordance with Example I, except that ethylene vinyl acetate was used in place of polyvinyl acetate, and that 70 parts (instead of 60 parts) tap water were used.

The particular advantage of the coating produced using this composition was that it was waterproof and thus more suitable for exterior finishes than the coating of Example I.

EXAMPLE III

A Composition Usable to Provide a Marble-Like Finish

1/2. Making and applying the composition

Phases 1 and 2 were exactly according to Example I, except that synthetic onyx powder (obtainable from ALEC TIRANTI) was employed instead of iron powder.

3. Subsequent Treatment

The finish after the applications was a matt, white colour, giving the appearance of unpolished marble. When the second coat was completely dry, it was wax-polished using a shoe-brush, with black/tan shoe polish to pick out a relief. The excess was brushed off. The finish was then vigorously scrubbed with first medium wire-wool then fine wire-wool, to give an old marble appearance.

EXAMPLE IV

A Composition Usable to Provide a Slate-Like Finish

Phases 1 and 2 were exactly as in Example I, except that slate powder (available from ALEC TIRANTI) was used instead of iron powder.

There was no "subsequent treatment" phase 3.

EXAMPLE A

A Composition Using an Acrylic as the Sole Polymer Component

1. Making the composition 20 parts of powdered brass were mixed with 30 parts of a commercially-available acrylic polymer aqueous dispersion composition (of the sort used as a floor varnish).

2. Applying the composition to a wood substrate

To apply a satisfactory coat of the formed composition to a wood substrate, an ordinary brush was used to paint on a layer. A natural sponge was then dabbed onto the surface (before it had completely dried) to create a textured finish looking much like the original powdered brass.

3. Subsequent treatment

The fully-dried coating was then finished in different ways. In one case it was rubbed very gently with a fine wire suede brush, and was given a dull shine. In a second it was burnished with a steel implement, and was given a high shine indistinguishable from that of real metal. In a third it was treated with TORMALENE or COPRA, and showed a blackened or verdigris finish just as a real brass surface would.

This Example was repeated using 30 parts of a commercially-available acrylic polymer composition of the sort used as a picture varnish, and produced similar results.

EXAMPLE B

A Composition Using a Vinyl Acetate as the Sole Polymer Component

1. Making the composition 50 parts of water were blended into 100 parts of polyvinyl acetate (PVA: the sort commercially available as a sealant/adhesive composition), and to 30 parts of the resultant mixture were added 20 parts of powdered brass. The whole was thoroughly mixed.

2. Applying the composition to a wood substrate

The formed composition was painted onto a wood substrate using a brush, and then dabbed with a sponge (before it had completely dried) to create a textured finish looking much like the original powdered brass.

3. Subsequent treatment

The fully-dried coating was then finished in different ways. In one case it was burnished with a steel implement, and was given a high shine indistinguishable from that of real metal. In another, this latter finish was subsequently treated with TORMALENE or COPRA, and showed a blackened or verdigris finish just as a real brass surface would.

This Example was repeated using 30 parts of a different commercially-available PVA composition, and produced similar results.

EXAMPLE C

A Composition Using Detergent and Thickener

1. Making the composition

To 100 parts of a commercially-available polyvinyl acetate composition (PVA: the sort used as an adhesive/sealant) were added 20 parts of a commercially-available acrylic polymer composition (the sort commercially available as a floor varnish), and after stirring 50 parts of water were mixed therewith, together with 1.5 parts of a clear liquid detergent (of the sort commercially available as a washing-up liquid) and 1 part of the commercial thickener AQUA PASTO (from Windsor & Newton).

To 30 parts of the resulting mixture were added 20 parts of powdered nickel-brass, and the whole was thoroughly blended together.

2. Applying the composition to a wood substrate

Using an ordinary brush, the formed composition was painted onto a wood substrate, and a natural sponge was then dabbed onto the surface (before it had completely dried) to create a stippled finish.

3. Subsequent treatment

The fully-dried coating was then finished in two sequential steps. First, it was burnished with a steel implement, and was thusly given a high shine indistinguishable from that of real nickel. Then, it was treated with TORMALENE, and showed a blackened finish, which when buffed with a cotton cloth produced a real antique "gun-metal" finish.

Similar compositions were also prepared using one or other of copper and bronze as the powdered metal, including the subsequent treatment with either TORMALENE or COPRA. The obtained results were much the same, save for the colour of the finished coating.

A further Example was of two compositions utilising either powdered aluminium or powdered silver as the metal (there was no subsequent treatment). Again, the results were much the same.

EXAMPLE D

A Composition Providing the Appearance of Antique Metal

1. Making the composition

In much the same way as described in Example C above, to 100 parts of a commercially-available polyvinyl acetate composition (PVA: the sort used as an adhesive/sealant) were added 20 parts of a commercially-available acrylic polymer composition (the sort commercially available as a floor varnish), and after stirring 50 parts of water were mixed therewith, together with 1.5 parts of a clear liquid detergent (of the sort commercially available as a washing-up liquid) and 1 part of the commercial thickener AQUA PASTO (from Windsor & Newton).

To 30 parts of the resulting mixture were added 20 parts of powdered brass together with 5 parts of fluffy black carbon powder (this was SCHWARZ 4, available commercially from Hefners), and the whole was thoroughly blended together.

2. Applying the composition to a wood substrate

Using an ordinary brush, the formed composition was painted onto a wood substrate, and a natural sponge was then dabbed onto the surface (before it had completely dried) to create a stippled finish.

3. Subsequent treatment

The fully-dried coating, which had a matt black appearance, was then finished in two sequential steps. First, it was rubbed very gently with a fine wire suede brush; this produced a result like aged brass (matt, dull brass). Then, this was burnished with a steel implement, and was thusly given a high shine; the whole looked just like a piece of antique metal.

This Example was repeated using 100 parts PVA, 25 parts acrylic and 60 parts water, and 30 parts of this composition were then blended with 20 parts powdered metal and 5 parts fluffy black carbon. When the whole was used to give a wood substrate a surface coating, and then "finished" as described, the results were very similar.

The Example was repeated in exactly the same two ways as described above, save for the use of an ethylene vinyl acetate polymer (EVA; commercially available as a waterproof adhesive/sealant) instead of PVA. In each case the results were very similar.

EXAMPLE E

A Composition Usable to Make Solid Articles

1. Making the composition

To 100 parts of a commercially-available polyvinyl acetate composition (PVA: the sort used as an adhesive/sealant) were added 20 parts of a commercially-available acrylic polymer composition (the sort commercially available as a floor varnish). 15 Parts of the resultant composition were added to 15 parts of wet paper pulp (this gives about 5–10 parts of water, depending on the exact wetness of the pulp), and the whole was thoroughly mixed. To this were added 40 parts of powdered, and the whole was blended together for about a minute, and then kneaded into a putty-like mass. The mass was shaped into a cube, and allowed to dry (set).

2. Subsequent treatment

The fully-dried cube was then carved into a decorative shape, and the carving's surface burnished with a steel implement, being thusly given a high shine indistinguishable from that of real brass.

Then, it was treated with TORMALENE or COPRA, and showed a blackened or patinated finish just like the real thing.

What is claimed is:

1. A composition for applying as a coating to a surface to give a metallic or stone appearance to the surface, the composition comprising an aqueous dispersion of solid particles within a resinous carrier and comprising:
   a metal, or metal alloy or inorganic non-metal particulate solid;
   a particulate organic film-forming vinyl acetate polymer (or copolymer) having a $T_g$ of below 10° C.; and
   a particulate organic film-forming acrylate polymer (or copolymer) having a $T_g$ of above 30° C.

2. A composition for applying as a coating to a surface to give a metallic or stone appearance to the surface, the composition comprising an aqueous dispersion of solid particles within a resinous carrier and formed by mixing:
   a metal, or metal alloy or inorganic non-metal particulate solid;
   a first product containing particulate organic film-forming vinyl acetate polymer (or copolymer) and having a $T_g$ of between 0° C. and 20° C.; and
   a second product containing a particulate organic film-forming acrylate polymer (or copolymer) and having a $T_g$ of between 30° C. and 70° C.

3. A composition as claimed in claim 2, the composition being an aqueous dispersion of solid particles within a resinous carrier and comprising:
   from 5% to 80% by volume of particulate solid dispersed within said carrier, said carrier having been formed from a vinyl acetate polymer product and an acrylic polymer product.

4. A composition as claimed in claim 3, wherein said carrier has been formed from said vinyl acetate polymer product, said acrylic polymer product and water in the proportions of:
   100 parts of said vinyl acetate polymer product
   5 to 80 parts of said acrylic polymer product, and
   30 to 80 parts of water.

5. A composition as claimed in claim 2, and workable in the manner of a paint by brushing onto a surface, wherein there is from 15% to 50% by volume of particulate solid.

6. A composition as claimed in claim 2, wherein there is from 5% to 45% by volume of particulate solid.

7. A composition as claimed in claim 5, wherein there is from 35% to 45% by volume of particulate solid.

8. A composition as claimed in claim 2 and workable by handling and by moulding, wherein there is from 15% to 70% by volume of particulate solid.

9. A composition as claimed in claim 8, wherein there is from 50% to 60% by volume of particulate solid.

10. A composition as claimed in claim 2, which comprises a mixture of both vinyl acetate polymer product and acrylic polymer product, and wherein per 100 parts of vinyl acetate polymer product there are from 15 to 35 volume parts of acrylic polymer product.

11. A composition as claimed in claim 10, wherein there are from 15 to 25 volume parts of acrylic polymer.

12. A composition as claimed in claim 4, wherein the composition comprises a preliminary composition wherein, per 100 parts of vinyl acetate polymer, there are 25 parts of acrylic polymer and 50 to 70 parts of water, and, for each 30 parts of this preliminary composition the composition further comprises, 20 parts of solid powder.

13. A composition as claimed in claim 2, wherein there is included one or more of a particle-suspending surface active agent and a thickening agent.

14. A composition as claimed in claim 2, wherein there is included a bulking agent.

15. A composition as claimed in claim 14, wherein the bulking agent is cellulose fibres.

16. A method of supplying the surface of a substrate of one material with a surface coating giving the substrate the appearance of another material, in which method there is applied to the substrate surface a composition comprising an aqueous dispersion of solid particles within a resinous carrier and formed by mixing:
   a metal, or metal alloy or inorganic non-metal particulate solid;
   a first product containing particulate organic film-forming vinyl acetate polymer (or copolymer) and having a $T_g$ of between 0° C. and 20° C.; and
   a second product containing a particulate organic film-forming acrylate polymer (or copolymer) and having a $T_g$ of between 30° C. and 70° C. and the composition is allowed to set to form the surface coating.

17. A method as claimed in claim 16, in which the formed surface coating is, while still unset, dabbed to give it a stippled finish, or is, when fully set, polished, burnished or buffed to give it a shine.

18. A process for providing a metallic or stone appearance to the surface of an article which processes comprises the steps of:
   (a) applying to the surface a coating of an aqueous coating composition and allowing the coating to dry wherein the coating composition contains:
      i) particles of an organic film-forming vinyl acetate polymer (or copolymer) having a $T_g$ (glass transition temperature) of below 10° C.,
      ii) particles of an organic film-forming acrylate polymer (or copolymer) having a $T_g$ of above 30° C.; and
      iii) particles of an opaque, translucent or transparent metal, or metal alloy or inorganic non-metal;
   (b) at least partially drying the coating; and
   (c) then removing at least some of the polymer in the coating by rubbing the coating whereby the metal or non-metal particles provide the metallic or stone appearance on the surface of the article.

* * * * *